Jan. 16, 1951   M. W. ROSCOE ET AL   2,538,166
CROP-MOVING MEANS FOR HARVESTER GATHERING UNITS
Filed Dec. 13, 1948   2 Sheets-Sheet 1

INVENTORS
M. W. ROSCOE
J. F. FOSTER
BY
ATTORNEYS

Jan. 16, 1951 M. W. ROSCOE ET AL 2,538,166
CROP-MOVING MEANS FOR HARVESTER GATHERING UNITS
Filed Dec. 13, 1948 2 Sheets-Sheet 2
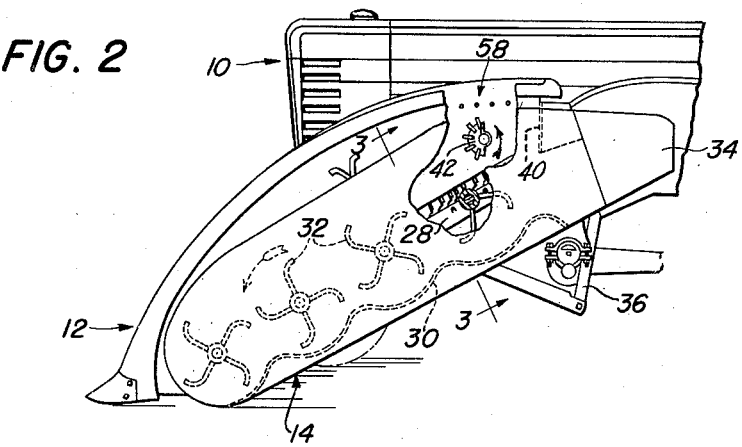
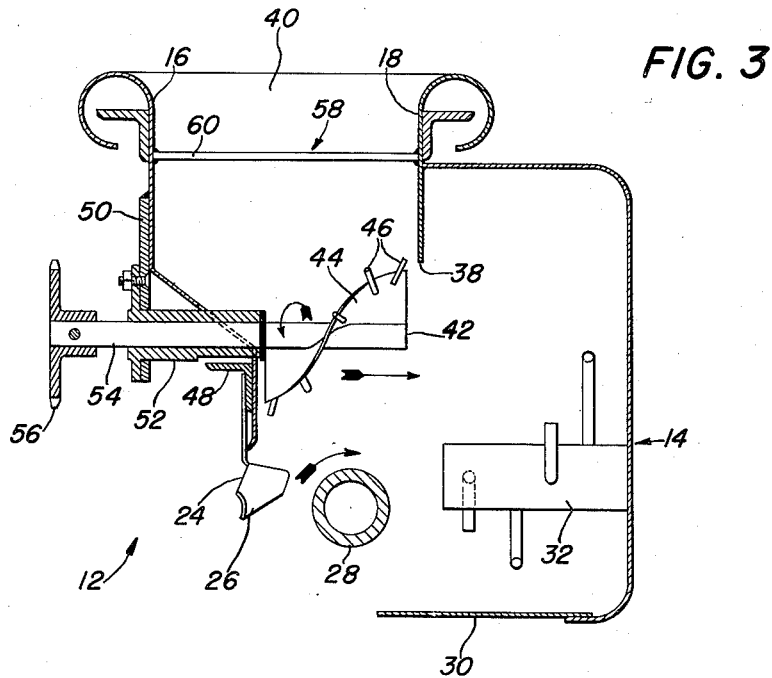
INVENTORS
M. W. ROSCOE
J. F. FOSTER
BY
ATTORNEYS Patented Jan. 16, 1951

2,538,166

UNITED STATES PATENT OFFICE 2,538,166

CROP-MOVING MEANS FOR HARVESTER GATHERING UNITS

Merrill W. Roscoe and Jack F. Foster, Moline, Ill., assignors to Deere & Company, Moline, Ill., a corporation of Illinois Application December 13, 1948, Serial No. 65,014

2 Claims. (Cl. 56—35)

This invention relates to crop-moving means for a harvester and more particularly to such means in the form of an agitator or beater in the throat of the gathering means.

Row-crop harvesters, of which a cotton stripper is one example, usually have a gathering unit mounted on a mobile frame or its equivalent for travel forwardly over a field to cause crops to enter a longitudinally extending throat, wherein such crops are stripped or snapped from their stalks and are delivered laterally to an offset receiving means which ultimately conveys the snapped or stripped crops rearwardly. It has been found in the operation of a cotton stripper, for example, that cotton and cotton bolls can be accepted so rapidly by the gathering unit as to tend to clog the rear portion of the unit before all of the stripped cotton and bolls can move laterally to the receiving means. According to the present invention, it is an important feature to provide means at an upper and rear portion of the gathering unit to facilitate lateral movement of the crops and hence to eliminate the clogging. Another feature of the invention is to provide baffle means at an upper portion of the gathering unit to prevent the upward escape of crop material traveling upwardly and rearwardly in the unit. A still further feature of the invention resides in combining the agitating means and the baffle means for the purpose of eliminating clogging of the gathering unit and for facilitating lateral transfer of the snapped or stripped crops to the receiving means.

A still further feature of the invention resides in the provision of the agitator as an auger or helicoid, particularly one in which the flight is toothed or provided with spikes. The invention also features a baffle or shield provided as a perforate structure, preferably in the form of a plurality of rods or the like spaced apart and lying generally in a horizontal plane above the agitator or beater.

The foregoing and other important objects and desirable features inherent in and encompassed by the invention will become apparent as a preferred embodiment of the invention is fully disclosed in the following specification and accompanying sheets of drawings in which:

Figure 2 is a side elevational view of the gathering unit, a portion thereof being broken away to expose the agitator and also to show part of the conveying means in the receiving means; and Figure 3 is an enlarged fragmentary sectional view taken substantially in the plane indicated by the line 3—3 in Figure 2.

Figure 1:
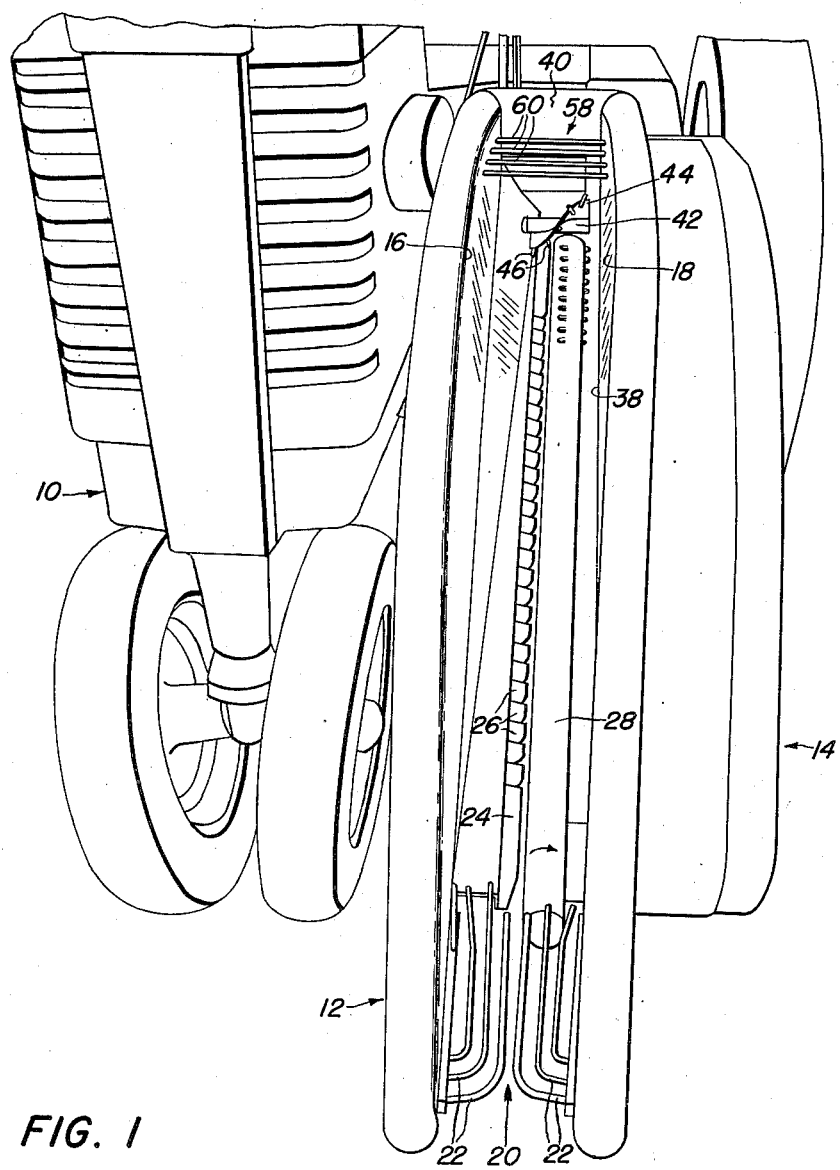
Figure 1 is a fragmentary perspective view of a cotton stripper gathering unit as associated with a row-crop tractor.

Although the invention is illustrated and will be described in connection with a tractor-mounted cotton stripper, it will be understood that the principles of the invention are otherwise applicable. Hence, the present disclosure should be taken as illustrative and not limiting.

The harvester illustrated is a cotton stripper of the type provided as a one-row or two-row unit in association with a tractor, in which case the tractor constitutes a mobile frame on which the cotton stripper is carried. Inasmuch as the tractor itself forms no part of the present invention, it will not be described in detail and will be designated merely in general by the reference numeral 10. The tractor carries at one side thereof the harvester which includes a gathering unit or means designated generally by the numeral 12, alongside of which is a receiving means or unit indicated generally by the numeral 14.

The gathering unit 12, as is typical of the present and similar constructions, includes laterally spaced portions in the form of substantially vertical side walls 16 and 18, the upper edges of which are rolled outwardly and inclined upwardly and rearwardly to facilitate the gathering of crops and to enhance the appearance of the unit. The side walls 16 and 18 form, with other parts of the gathering unit, a substantially central, rearwardly and upwardly inclined crop-receiving throat 20 which is defined at its lower forward portion by a plurality of divider or deflector rods 22 and which is defined in its length by a pair of gathering members, one of which is a substantially stationary member 24 comprising a plurality of flexible elements 26, and the other of which is a harvester roll 28 which inclines upwardly and rearwardly and which is rotatable in the direction of the arrows in Figures 1 and 3. The particular form of the members 26 and 28 is not critical in so far as concerns the present invention, the arrangement shown forming the subject matter of assignee's co-pending application, Serial No. 49,344, filed September 15, 1948, now Patent No. 2,508,966.

In operation, the harvester unit is driven forwardly over the field so that a row of standing crops is caused to enter the throat 20 between the members 26 and 28. In a unit of the type herein illustrated, forward travel of the unit with respect to the standing crops is sufficient to strip or snap the crops from the stalks on which the crops are grown, which operation is followed by lateral discharge of the crops to the receiving means 14, in a manner which will be presently described.

As best shown in Figure 2, the receiving means 14 comprises a unit which is laterally offset with respect to the gathering unit 12 but which inclines upwardly and rearwardly substantially parallel to the gathering unit. As shown in Figure 3, the lower portion of the receiving unit 14 comprises a bottom wall 30, the general level of which is slightly below the general level of the roll 28. Hence, the normal tendency of crops stripped or snapped by the gathering unit is to move laterally into the receiving means 14. As shown in Figure 2, the bottom 30 may be sinuous or undulating and may include conveying means here shown as comprising a plurality of beaters 32 which are rotatable in the direction indicated by the dotted arrows in Figure 2. However, any other form of construction may be used in this respect, that illustrated being disclosed and claimed in assignee's co-pending application, Serial No. 586,780, filed April 5, 1945, now Patent No. 2,533,510. The upper and rear portion of the receiving means 14 has discharge means 34 for ultimately delivering crops to additional crop-handling means (not shown) whence the crop material is conveyed to a wagon, truck or other receptacle, all as is generally conventional. The illustration of such details has been omitted in the interests of clarity and brevity.

The numeral 36 in Figure 2 illustrates generally the structure by means of which the gathering and receiving means are supported on the tractor 10.

Figure 3 illustrates that the inner side wall or portion 16 extends downwardly and inclines toward the other side wall 18 and is then directed downwardly to adjoin the gathering member 24 which includes the flexible sections 26. Figure 3 also illustrates that the wall 18 extends downwardly and terminates a substantial distance above the harvester roll 28 so that a communicating opening 38 is established between the gathering unit and the receiving unit, through which opening crops are transferred from the members 24 and 28 to the receiving means 14. The side wall portions thus further define the throat 20 and give substantial depth thereto for the purpose of increasing the capacity of the gathering unit. The rear and upper portion of the throat is closed by a transverse substantially vertical wall 40. Hence, the wall 40 normally interrupts rearward travel of the crop material as the harvester unit moves forwardly. As previously stated, it has been found, however, that under certain conditions the gathering unit so readily accepts crop material as to result in clogging of the gathering unit, inasmuch as crops collect at the upper end portion and gradually work their way downwardly to interfere with fresh crop material being received. According to the present invention, this difficulty is eliminated by the provision of movable means at the upper rear portion of the gathering unit, just ahead of the transverse wall 40. In its preferred form, this means takes the form of a rotary element which is preferably an auger or helicoid 42 on which is carried a spiral flight 44 preferably having a circumferential extent of approximately 180 degrees. To further increase the efficiency of the auger or helicoid 42, the flight 44 is toothed, preferably by being provided with a plurality of spikes 46.

As best shown in Figure 3, the gathering unit includes a longitudinally extending frame member 48 which is associated with the inner side sheet 16 and with a plate or bracket 50 carried by the latter. This plate or bracket carries a tubular bearing 52 which journals a shaft extension 54 for the auger 42. Suitable means is provided for driving the auger, here indicated as a sprocket 56 keyed to the inner end of the shaft 54. This sprocket may be connected in any suitable manner to an appropriate source of power on the harvesting unit, the details of which form no part of the present invention.

The auger 42 is thus carried for rotation on an axis transverse to or crosswise of the gathering unit throat 20. The direction of rotation of the auger or beater is indicated by arrows in Figures 2 and 3. The construction of the auger or helicoid and the direction of rotation thereof is such as to render this means effective to move crops laterally from the inner side of the gathering unit to and through the opening 38 in the outer side wall or portion 18. It will be understood that normally in the stripping of cotton bolls from plants at the relatively high speeds obtainable in a tractor-propelled stripper, there is quite a profusion of bolls being forced to the rear or upper end of the gathering unit, in the presence of which the helicoid is effective to urge a substantial quantity of bolls toward the right (as viewed in Figure 3) without the necessity of a cooperating trough or pan as is conventionally used in positive-feed augers. The location of the agitating or moving means at the upper portion of the throat clears the throat and increases the capacity of the throat for handling crop material under all conditions. The straight arrow pointing to the right in Figure 3 indicates the direction of transfer of crops from the gathering unit to the receiving unit 14.

As a further adjunct to the means for increasing the efficiency of the gathering unit, the invention provides baffle or shield structure, designated generally by the numeral 58, and preferably comprising a perforate structure including a plurality of spaced-apart members such as rods or the like 60 lying substantially in a horizontal plane above the auger means 42. As best seen in Figures 1 and 3, the rods 60 extend crosswise between the wall portions 16 and 18. The rods 60 thus provide a grid which operates at the upper end of the gathering unit to prevent crop material from being thrown upwardly and out of the gathering unit by the beater or auger means 42. Even without the beater or auger means, the grid or baffle structure 58 is operative to prevent crop material from surging out of the gathering unit because of the speed with which the gathering unit is moving forwardly relative to the standing crops.

Various details of the structure illustrated may be altered to suit particular situations. Features of the invention not particularly pointed out will readily occur to those versed in the art, as will variations suggested by the present disclosure, all of which may be achieved without departing from the spirit and scope of the invention as defined in the appended claims.

What is claimed is:

1. In a harvester having a frame adapted to travel forwardly over a field and including a crop-gathering unit made up of a pair of gathering members forming a throat extending generally lengthwise as respects the direction of travel and having front and rear ends, said unit further including inner and outer generally vertical, laterally spaced side portions giving depth to the throat and having upper edges above the general level of the gathering members, the outer of said side portions having an opening therein through which crops may move laterally, and crop-receiving means outwardly of and alongside said unit for receiving crops directly from the gathering members via the opening, the improvement comprising: baffle means, including a plurality of rods or the like, carried by the inner side portion at the rear thereof and extending toward the outer side portion at a level above the gathering unit members and over only the rear portion of said throat, said rods terminating at said outer side portion and being thereby extended from the crop-receiving means.

2. In a harvester having a frame adapted to travel forwardly over a field and including a gathering unit for gathering crop material as the harvester travels forwardly, said gathering unit being of the type including a pair of crop-gathering members forming a throat extending generally lengthwise as respects the direction of travel and including front and rear ends, and said unit having crop-receiving means laterally offset to one side of but in communication with the throat to receive crops in a transverse direction from the crop-gathering members, the improvement comprising: a rotary element carried by the gathering unit at the rear end of the throat for rotation about an axis extending crosswise of the throat, said element including a shaft having a helical flight for moving gathered crops laterally toward the crop-receiving means and said flight having spikes extending generally radially outwardly beyond the periphery of the flight.

MERRILL W. ROSCOE.
JACK F. FOSTER.

REFERENCES CITED

The following references are of record in the file of this patent:

UNITED STATES PATENTS

| Number | Name | Date |
|---|---|---|
| 1,862,384 | Millar | June 7, 1932 |
| 1,906,692 | Lindgren et al. | May 2, 1933 |
| 1,917,583 | Griffen | July 11, 1933 |
| 1,926,388 | Jones | Sept. 12, 1933 |
| 1,990,816 | Conrad | Feb. 12, 1935 |
| 2,045,633 | Court | June 30, 1936 |